(12) United States Patent
Frustaci et al.

(10) Patent No.: US 7,718,310 B1
(45) Date of Patent: May 18, 2010

(54) ELECTROCHEMICAL CELL HAVING A GALAXY WIND DESIGN

(75) Inventors: Dominick Frustaci, Williamsville, NY (US); Tina Urso, East Amherst, NY (US); Paul Hallifax, Gasport, NY (US); Kenneth P. Moceri, North Tonawanda, NY (US)

(73) Assignee: Greatbatch Ltd., Clarence, NY (US)

( * ) Notice: Subject to any disclaimer, the term of this patent is extended or adjusted under 35 U.S.C. 154(b) by 849 days.

(21) Appl. No.: 11/552,156

(22) Filed: Oct. 24, 2006

(51) Int. Cl.
*H01M 2/16* (2006.01)
*H01M 2/14* (2006.01)
*H01M 2/02* (2006.01)

(52) U.S. Cl. .................. 429/145; 429/129; 429/131; 429/178

(58) Field of Classification Search .................. 429/178, 429/145, 129, 131
See application file for complete search history.

(56) References Cited

U.S. PATENT DOCUMENTS

| | | | |
|---|---|---|---|
| 3,425,837 A * | 2/1969 | Conte et al. .................. 426/648 |
| 4,310,609 A | 1/1982 | Liang et al. | |
| 4,391,729 A | 7/1983 | Liang et al. | |
| 5,443,928 A | 8/1995 | Takeuchi et al. | |
| 5,472,810 A | 12/1995 | Takeuchi et al. | |
| 5,516,340 A | 5/1996 | Takeuchi et al. | |
| 5,744,261 A | 4/1998 | Muffoletto et al. | |
| 5,750,286 A * | 5/1998 | Paulot et al. ................. 429/211 |
| 5,882,362 A | 3/1999 | Muffoletto et al. | |
| 6,004,692 A | 12/1999 | Muffoletto et al. | |
| 6,420,066 B1 | 7/2002 | Frustaci et al. | |
| 6,423,442 B1 | 7/2002 | Hallifax et al. | |
| 6,425,928 B2 | 7/2002 | Hallifax et al. | |
| 6,586,134 B2 | 7/2003 | Skoumpris | |
| 6,828,059 B2 * | 12/2004 | Miller et al. ................... 429/94 |

* cited by examiner

*Primary Examiner*—Patrick Ryan
*Assistant Examiner*—Julian Mercado
(74) *Attorney, Agent, or Firm*—Michael F. Scalise (57) ABSTRACT

An electrochemical cell is described. The cell comprises a cathode material contacted to a perforated current collector having a portion left uncovered and an anode material contacted to an anode current collector. The anode comprises first and second strips positioned on opposite sides of the cathode, which is also in the form of a strip, but one that is much longer than each of the anode strips. Proximal ends of the anode strips reside adjacent to where the cathode is secured to a terminal pin/sleeve assembly. Distal ends of the anode strips are adjacent to the opposed ends of the cathode strip. A separator sheet segregating the anode from direct contact with the cathode provides an upper portion at least partially sealed to a lower portion along an aligned peripheral edge and through the uncovered perforations of the cathode current collector to lock the cathode in position. The anode and cathode are then wound into a galaxy electrode assembly housed in a cylindrical casing and activated with an electrolyte.

24 Claims, 10 Drawing Sheets

ELECTROCHEMICAL CELL HAVING A GALAXY WIND DESIGN

BACKGROUND OF THE INVENTION

The present invention generally relates to the conversion of chemical energy to electrical energy. More particularly, the invention describes an electrochemical cell having an anode or negative electrode and a cathode or positive electrode provided in a galaxy-type configuration. This electrode assembly is then housed in a cylindrically shaped casing. A preferred chemistry of the cell is of a lithium anode and a silver vanadium oxide cathode.

SUMMARY OF THE INVENTION

The present invention relates to an electrochemical cell comprising an anode active material, such as lithium or $LiC_6$, contacted or covering an anode current collector and a solid cathode active material, such as silver vanadium oxide, fluorinated carbon, or lithium cobalt oxide, contacted to or covering a perforated cathode current collector. A minor portion of the cathode current collector is left bare or uncovered by cathode material.

A terminal pin is joined to the cathode current collector at the uncovered portion. The terminal pin is preferably of molybdenum, while the cathode current collector is preferably of titanium or aluminum. Since these materials are difficult to weld together, especially with the terminal pin being of a relatively small diameter, a portion of the terminal pin is received in a couple, preferably of titanium, and the couple is secured to the uncovered portion of the titanium cathode current collector. The portion of the terminal pin without the couple is supported in a lid by an insulating glass.

A flanged-shaped, upper insulator electrically insulates the couple and pin from the bottom of an upper casing lid and the casing sidewall. This prevents potential bridging of lithium clusters between surfaces of opposite polarity. Conventionally, the insulating component for this purpose has been in the form of a thin walled cup with the base of the cup insulating the bottom of the upper lid and the cup walls insulating the side walls of the casing from the pin and couple, as described in U.S. Pat. Nos. 5,744,261, 5,882,362, and 6,004,692, all to Muffoletto, et al. These patents are assigned to the assignee of the present invention and incorporated herein by reference.

The anode is comprised of separate first and second anode strips extending outwardly from the terminal pin/couple and on opposite sides of the cathode strip. Each anode strip includes an anode current collector having lithium contacted to both of its major sides. The anode and cathode strips are now in an aligned and overlaying relationship with each other and the assembly is wound to form a galaxy-type electrode assembly. An outer wrap of the anode may have the anode active material only on the inner side of the anode current collector. Similarly, the inner wrap of the anode may have the anode active material only on the outside of the anode current collector facing cathode active material. In these locations, it is only useful to have lithium directly opposite the cathode active material. This helps with volumetric efficiency, as there is no need to have lithium active material unopposed by cathode active material.

At least one separator segregates the cathode from direct contact with the anode. Preferably, a separator for the cathode is provided as a sheet of woven or non-woven ionically permeable material folded back upon itself along a crease. An upper portion of the cathode separator is at least partially heat sealed to a lower portion along aligned peripheral edges thereof. The upper and lower cathode separator portions may also be heat sealed to each other through the cathode current collector perforations on opposite sides of the terminal pin/couple assembly. Separate second separator portions envelope each of the first and second anode portions.

The electrode assembly including the lid and upper insulator supported by the terminal pin/couple is then fitted into a cylindrical casing. The anode current collector has at least-one extending lead or tab captured between the lid and the cylindrical casing. Welding the upper lid to the casing connects the anode to the casing as its terminal while hermetically sealing the cell. The upper lid insulator also shields the separator of the electrode assembly from the heat of the upper lid-to-case weld. A lower insulator inserted onto the couple electrically separates the pin and the lower portion of the electrode assembly from the bottom of a lower lid and the adjacent casing sidewalls. This prevents possible bridging of lithium clusters between surfaces of opposite polarity there.

The electrode assembly is activated with an electrolyte, preferably of a non-aqueous chemistry. Finally, a fill plug is inserted into and welded to the lower lid. The lower lid insulator also serves to shield the separator of the electrode assembly from the heat of the final close weld.

These and other aspects of the present invention will become more apparent to those skilled in the art by reference to the following description and to the appended drawings.

DETAILED DESCRIPTION OF THE PREFERRED EMBODIMENTS

Figure 1:
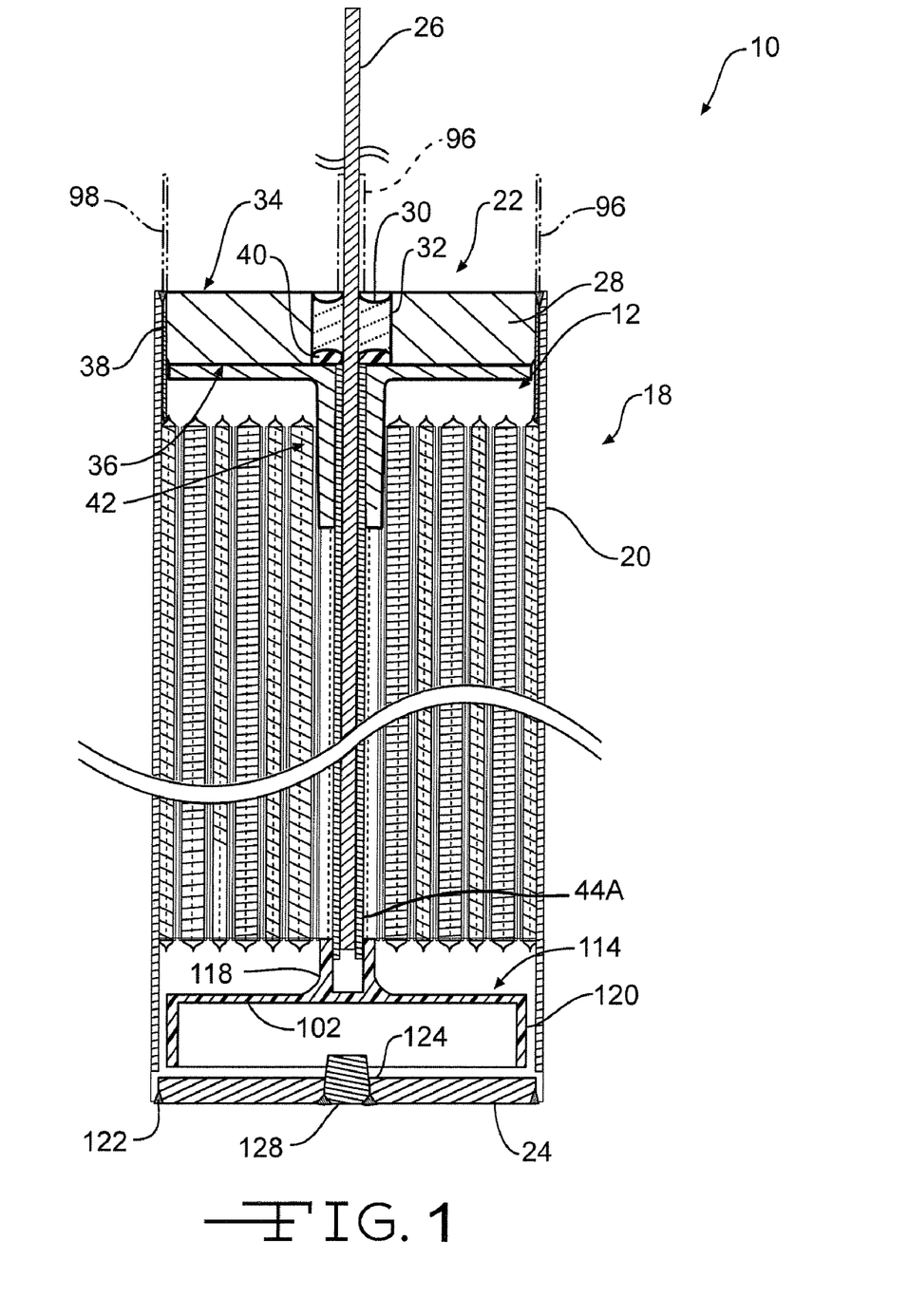
FIG. 1 is a cross-sectional view of an electrochemical cell 10 of the present invention.

Referring now to the drawings, FIG. 1 is a cross-sectional view of a "galaxy wound" electrochemical cell 10 according to the present invention. The cell comprises an electrode assembly 12 (FIG. 5) including a cathode 14 (FIG. 2) and an anode 16 (FIG. 4) provided in a galaxy configuration. The galaxy electrode assembly 12 is housed inside a cylindrically shaped casing 18 made of metal, such as stainless steel, titanium, nickel, aluminum, or other suitable electrically conductive material. The casing comprises a cylindrical tube 20 that is closed at its upper end by a header assembly 22 and at its lower end by a lower lid 24.

Figure 2:
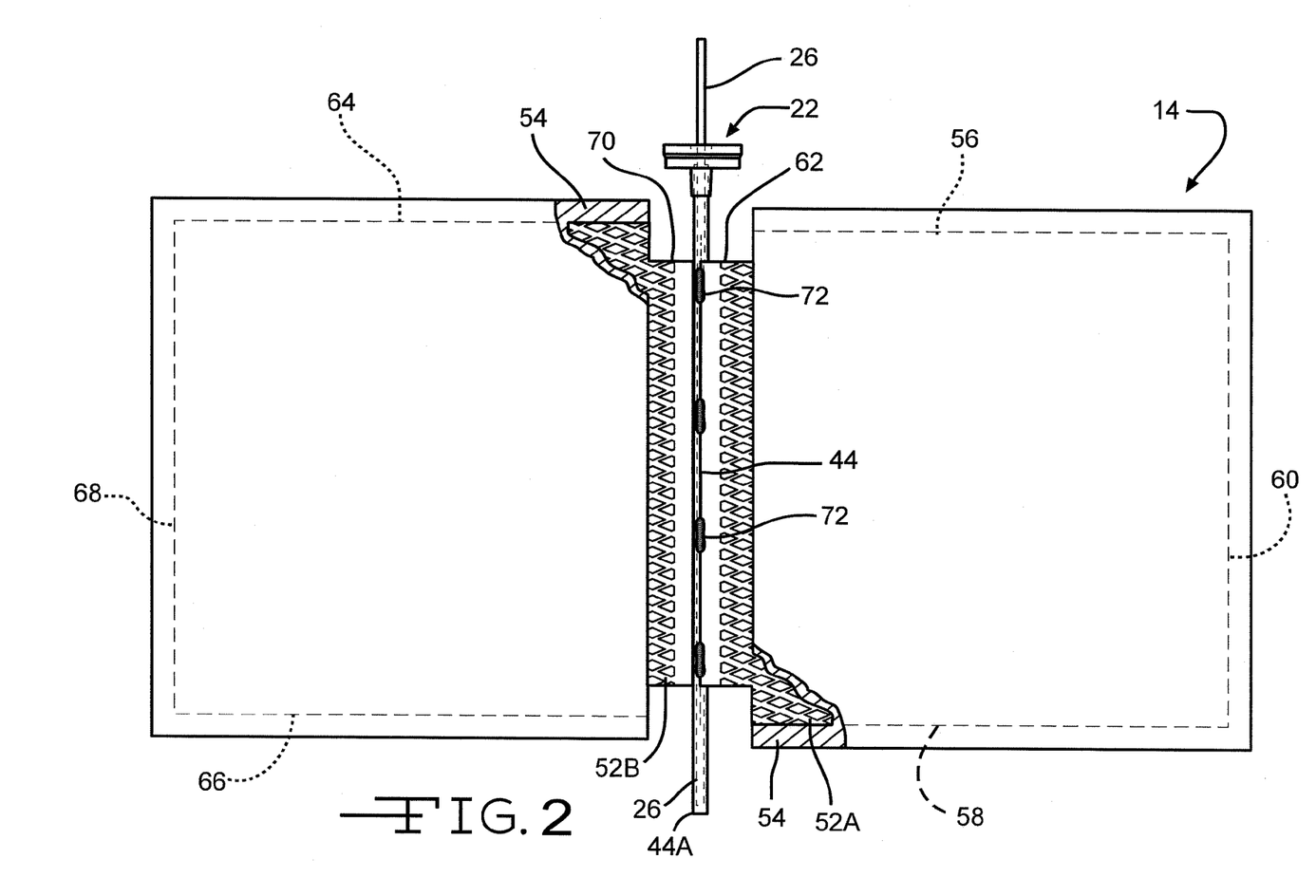
FIG. 2 is a plan view, partly broken away, of a cathode 14 connected to a terminal pin 26/couple 44 with the terminal pin being supported in a header assembly 22.
Figure 4:
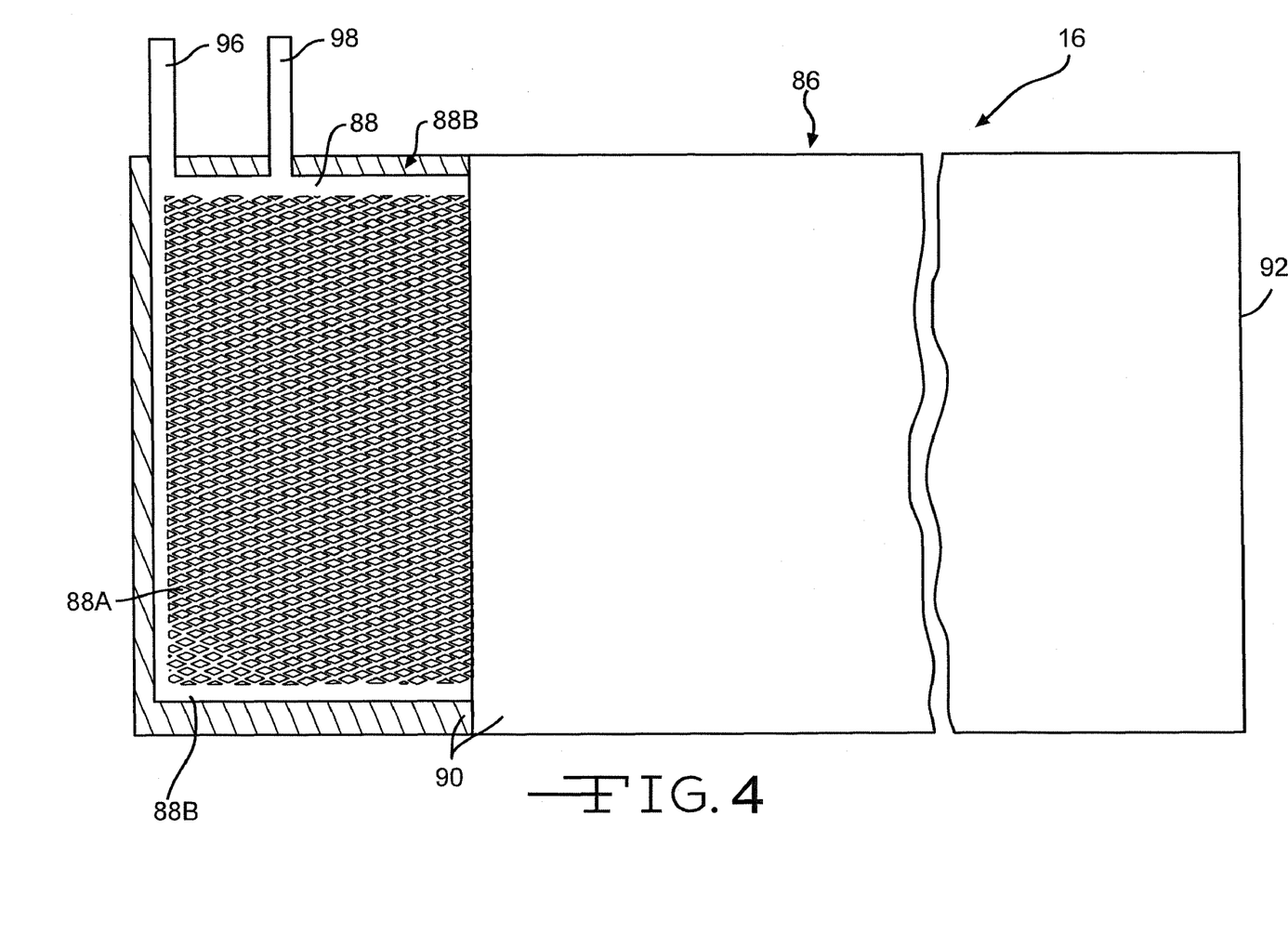
FIG. 4 is a plan view, partly broken away, of a left portion 86 of an anode 16.

Preferably, the cell 10 is built in a case negative design with the casing 18 serving as the anode terminal. However, the cell can also be built in a case-positive design. In that latter design, the electrode shown in FIG. 2 is the anode and the electrode in FIG. 4 is the cathode. Both the case-negative and case-positive electrode designs are well known by those skilled in the art.

In the preferred case-negative electrode design, the cathode 14 is connected to a terminal pin 26. The header assembly 22 (FIG. 3) fitted into the upper open end of the tube 20 comprises an upper lid 28 supporting a glass material 30 sealing between a lid opening 32 and the terminal pin 26. The sealing glass 30 is of a corrosion resistant type having up to about 50% by weight silicon such as CABAL 12, TA 23 or FUSITE 425 or FUSITE 435. This structure is commonly referred to as a glass-to-metal seal (GTMS).

Figure 3:
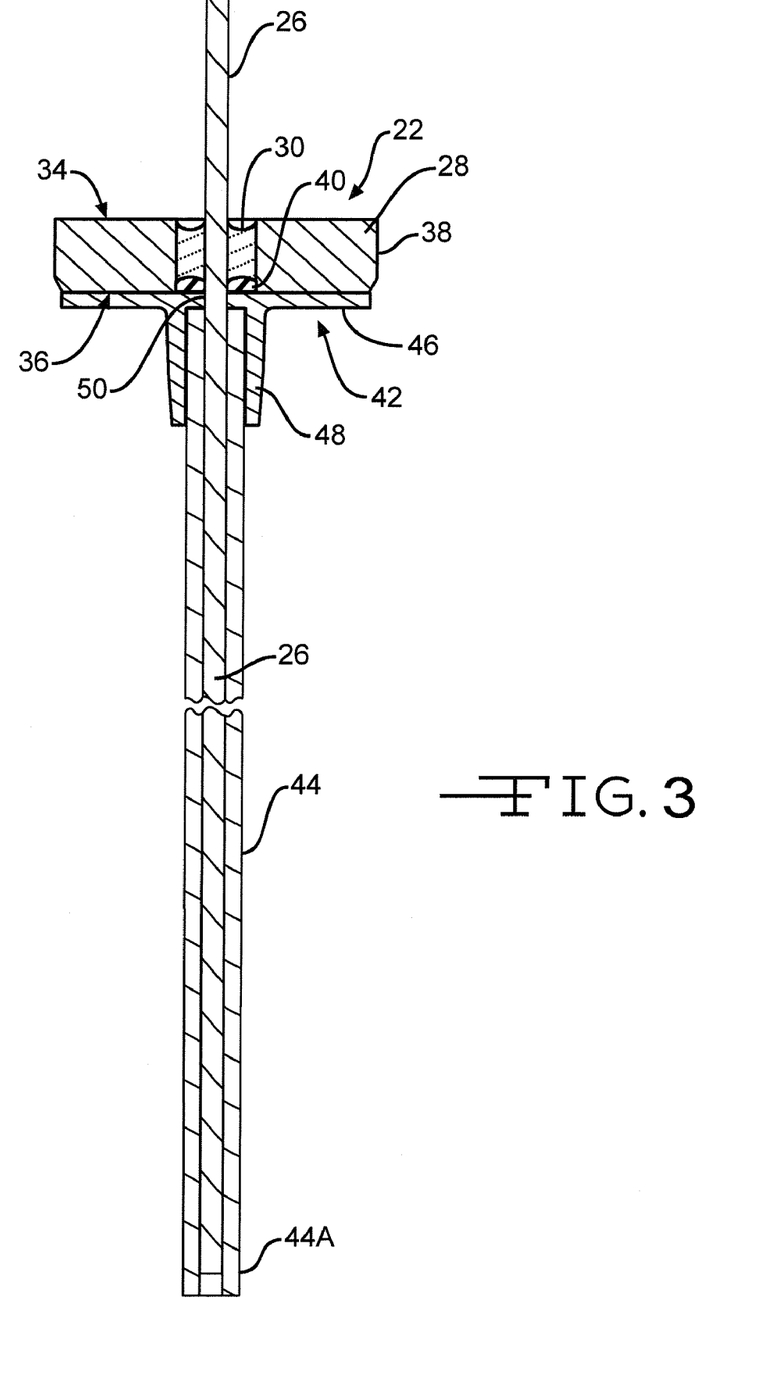
FIG. 3 is an enlarged cross-section view of the terminal pin 26/couple 44 assembly supported in the header assembly 22.

The upper lid 28 is a disc-shaped member of the same material as the casing and comprises an upper surface 34 and a lower surface 36 extending to a cylindrical sidewall 38. The sidewall 38 is beveled where it meets the lower lid surface 36. This helps with moving the lid 28 into the casing tube 20 having the lid sidewall 38 in a snug fitting relationship with the upper open end thereof. In this position, the upper lid surface 34 is coplanar with the upper end of the casing tube 20. A polymeric material 40 is filled into the lower meniscus of the sealing glass 30, generally coplanar with the lower surface 36 of the lid 28. The polymeric material 40 helps prevent electrolyte pooling in this area, which could be a potential space for lithium cluster bridging to the wall forming the lid opening 32. It also prevents attack of the sealing glass 30 by the cell electrolyte. The terminal pin 26 is of molybdenum, aluminum, nickel alloy, or stainless steel, the former being preferred.

As shown in FIG. 3, a polymeric insulator 42 fits onto the upper end of a terminal couple 44 below the header assembly 22. The insulator 42 comprises a circular disc portion 46 integral with a depending cylindrical portion 48. An opening 50 provided in the disc portion enables the insulator to slide over the terminal pin 26 while insulator cylindrical portion 48 is in a closely spaced relationship with the upper end of the terminal couple 44. Prior to the couple 44 being moved onto the terminal pin 26, the upper insulator 42 is seated against the lower surface 36 of the lid 28. In this position, the outer surrounding edge of the disc portion 46 meets the lower edge of the lid bevel. The terminal couple 44 is then slid over the terminal pin 26 in a tight fitting, contact relationship with a lower end of the pin recessed into the couple.

As shown in FIG. 2, the cathode current collector is in the form of strips comprising a right cathode current collector 52A and a left cathode current collector 52B. Both are of titanium, tantalum, platinum, gold, aluminum, cobalt nickel alloys, highly alloyed ferritic stainless steel containing molybdenum and chromium, and nickel-, chromium- and molybdenum-containing alloys, the former being preferred. The terminal couple 44 is of the same material as the cathode current collectors 52A, 52B, titanium being preferred. The previously described couple 44 helps bolster the connection between the terminal pin 26 and the cathode current collectors 52A, 52B for the reason that titanium is difficult to weld to molybdenum, especially in such a fine wire diameter as that of the terminal pin. The terminal pin is from about 0.010 to about 0.020 inches in diameter.

Each of the right and left current collector strips 52A and 52B have a cathode active material 54 contacted to both its major sides. The cathode active material 54 extends above and below the upper and lower edges 56 and 58 of the right cathode current collector 52A as well as past a right edge 60 thereof. However, a minor left edge portion 62 is uncovered by active material at both major sides thereof. Similarly, the cathode active material 54 extends above and below the upper and lower edges 64 and 66 of the left cathode current collector 52B as well as past a left edge 68 thereof. A minor right edge portion 70 is uncovered by active material at both major sides thereof.

The cathode current collectors 52A, 52B can be perforated or of a substantially imperforated foil. Preferably, the foil is solid or imperforate at a proximal end of its length where it contacts the terminal couple 44 and perforated for a minor portion of the respective central uncovered portions 62, 70 and for the entire length where the cathode active material 54 is contacted thereto. Resistive or another type of welding is used to provide welds 72 securing the uncovered current collector portions 62, 70 to diametrically opposite positions on the terminal pin 44.

In FIGS. 2, 3, 5 and 5A, the cathode 14 is shown having the right and left current collector strips 52A and 52B secured to the couple 44 with the terminal pin 26 supported in the lid 28 of the header 22 by the sealing glass 30. This assembly is then positioned on top of a separator 74 comprising a rectangular shaped piece of ionically porous polymeric material. The separator 74 is folded back upon itself to provide an upper portion 76 aligned with and substantially covering a lower portion 78. The upper and lower separator portions 76, 78 cover both sides of the cathode active material 54 and are heat secured to each other along their respective peripheral edges. While not shown in the drawings, the peripheral heat seal is made discontinuous at its upper edge by the couple 44 immediately adjacent to the cylindrical portion 48 of the insulator 42 abutting the lid 28 and at its lower edge by the couple 44 surrounding the distal end of the terminal pin 26.

Figures 5, 5A:
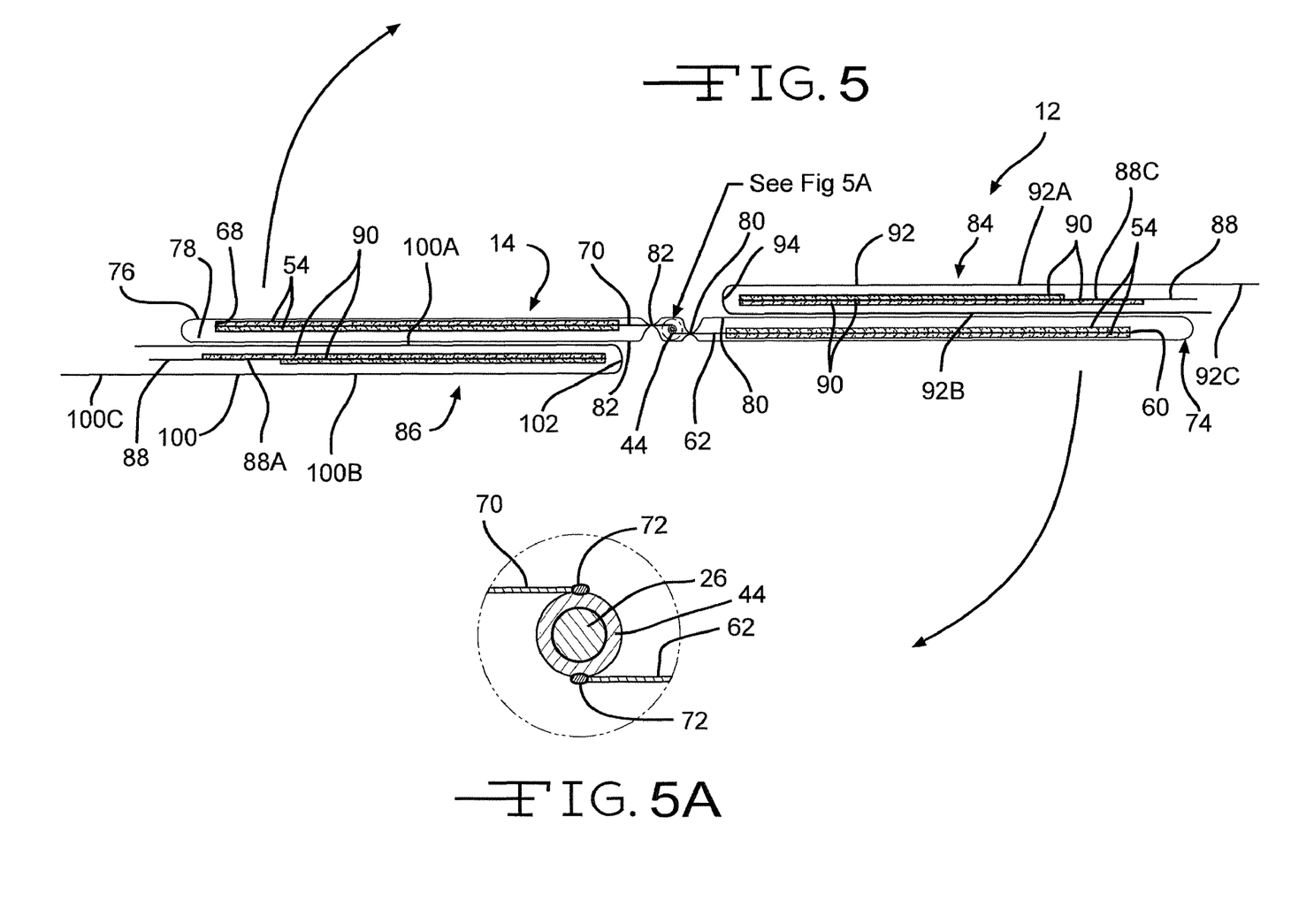
FIG. 5 is a side elevational view of the electrode assembly 12 comprising the cathode 14 and anode 16.
FIG. 5A is an enlarged, cross-sectional view of the indicated area in FIG. 5.

The upper and lower separator portions 76, 78 are then preferably heat secured to each other at right and left vertical seals 80 and 82. This is done by sealing them together through the perforations at the uncovered portions 62, 70 of the respective cathode current collectors 52A, 52B. The cathode 14 is now locked in position enveloped inside the separator 74.

FIG. 5 shows the anode 16 comprising a first anode strips 84 extending to the right and a second anode strip 86 extending to the left. FIG. 4 is an enlarged view of one of the anode strips 84, 86, for example the second strip 86. However, it should be understood that the anode strips are essentially identical, each comprising an anode current collector 88 supporting an anode active material 90 such as an alkali metal, preferably lithium. The lithium is contacted to both of the major current collector sides except at a selected end 88A thereof. There, the anode active material may only contact one major side of the current collector 88 for a distance equal to the length of the outer wrap of the final galaxy assembly 12 (FIG. 5). The reason for this will be explained in detail hereinafter.

The anode current collector 88 is preferably of nickel, copper or stainless steel and is shown having a grid pattern of open perforations surrounded by a peripheral edge 88B devoid of perforations. Alternatively, the anode current collector may be completely solid.

As shown in FIG. 5, the first anode strip 84 comprises the anode current collector 88 having an anode active material 90, preferably lithium, contacted to both of its major sides except at a right, distal end 88C thereof. There, anode active material 90 only contacts the lower major side facing the cathode for a distance equal to about one-half the length of the outer wrap of the final electrode assembly (not shown). The first anode strip 84 is provided with a separator 92 folded at a crease 94 adjacent to the couple 44. The folded separator covers both major sides of the lithium comprising the first anode strip by providing an upper portion 92A aligned with a lower portion 92B except for an extending flap 92C. The upper and lower separator portions 92A, 92B are sealed to each other at their aligned edges extending to the distal flap 92C. A pair of spaced apart leads 96 and 98 (FIG. 4), preferably integral with the current collector 88, extends through the upper sealed separator edge. The leads 96, 98 are spaced from each other a distance that places them on opposite sides of the galaxy electrode assembly 12 when it is housed inside the casing 18.

In a similar manner, the second anode strip 86 comprises the anode current collector 88, having lithium contacted to both of its major sides except at the previously described left, distal end 88A thereof. There, lithium only contacts the upper major side facing the cathode for about one half the length of the outer wrap of the final electrode assembly. The second anode strip 86 is then provided with a separator 100 folded at a crease 102 adjacent to the couple 44. The folded separator covers both major sides of the lithium comprising the second anode strip by providing an upper separator portion 100A aligned with a lower separator portion 100B except for an extending flap 100C. The upper and lower separator portions 100A, 100B are sealed to each other at their aligned edges extending to the distal flap 100C. A pair of spaced apart leads 96 and 98 (FIG. 4), preferably integral with the current collector 88, extends through the upper sealed separator edge. As with the first anode strip 84, the spacing between the leads 96 and 98 places them on opposite sides of the galaxy electrode assembly and offset 90° from the leads 96, 98 of the first anode strip.

To form the galaxy electrode assembly 12, the cathode 14 and anode 16 are provided in the relative positions shown in FIG. 5. Then, a guide (not shown) is attached to the terminal pin 26 adjacent to the lid 28 of the header assembly and a collet (not shown) is attached to the distal end of the couple 44. A rotating force is imparted to the collet to rotate the header assembly including the terminal pin 26/couple 44 approximately ¾ of a turn to begin wrapping the cathode current collector central portions 62, 70, which are devoid of active material, about the couple serving as a mandrel. The inner end of each of the anode strips 84 and 86 is spaced from the couple 44 so that they are each offset about 270° from the central cathode current collector portions 62, 70 welded to the couple 44. This winding continues until the anode strips 84 and 86 and the intermediate cathode 14 are provided in a galaxy electrode assembly similar to that described in U.S. Pat. Nos. 6,423,442 to Hallifax et al., 6,425,928 to Hallifax et al. and 6,420,066 to Frustaci et al. These patents are assigned to the assignee of the present invention and incorporated herein by reference. The galaxy electrode assembly is then housed inside the casing 18.

Figure 6:
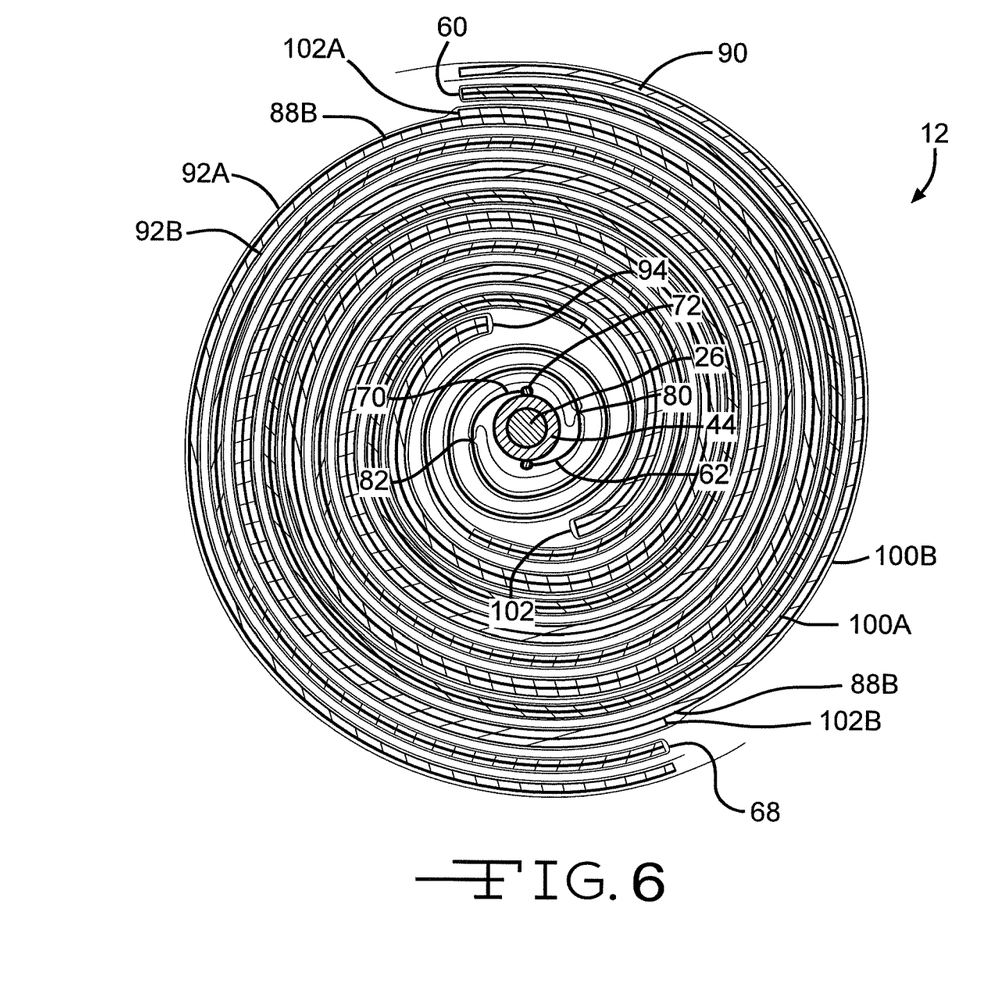
FIG. 6 is a cross-sectional view of the electrode assembly 12 provided in a galaxy wound configuration.

In the electrode assembly 12 illustrated in FIG. 6, the anode active material 90 contacted to both major sides of the anode current collectors 88 always "faces" the cathode active material 54. However, the distal current collector ends 88A, 88C having the anode active material 90 on only the inner side thereof extend beyond the left and right edges 68, 60 of the respective left and right cathode current collectors 52B, 52A having the cathode active material 90 contacted thereto. This provides a complete outer wrap around the electrode assembly 12 beginning at the points labeled 102A, 102B and extending to the opposite ends of the anode 16. This is substantially the outer circumference of the electrode assembly. There is no need for the anode current collectors 88 to have anode active material 90 on their outer side in the outer wrap because there is no cathode active material facing that side of the anode current collectors.

The galaxy electrode assembly 12 is then fitted into the cylindrical tube 20 of the casing 18 with the distal ends 88A, 88C of the anode current collectors 88 provided with anode active material 90 on only the inner side thereof being immediately adjacent to the tube 20 sidewall. The header assembly 22 comprising the lid 28 snuggly fits into the upper open end of the tube 20 with the four diametrically opposed anode leads 96 and 98 (one pair provided by each anode current collector 88) extending from the tube 20. The leads are trimmed flush to the top of the upper lid. The lid 28 is then hermetically sealed to the tube 20 such as by laser welding. The leads 96, 98 captured between the lid 28 and tube 22 electrically connect the anode 16 to the casing 18 serving as the negative cell terminal. The terminal pin 26, supporting the intermediate couple 44 contacting the cathode 16 and insulated from the lid 28 and casing 18 by the sealing glass 30, serves as the cathode terminal. For a more detailed description of a cell having an electrode lead captured between a lid and casing, reference is made to U.S. Pat. No. 6,586,134 to Skoumpris. This patent is assigned to the assignee of the present invention and incorporated herein by reference.

Figure 7:
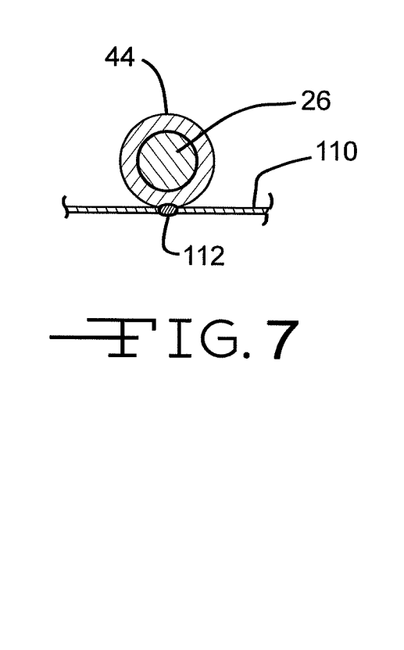
FIG. 7 is a cross-sectional view of an alternate embodiment for connecting the cathode current collector 110 to the terminal pin 26/couple 44 assembly.
Figure 8:
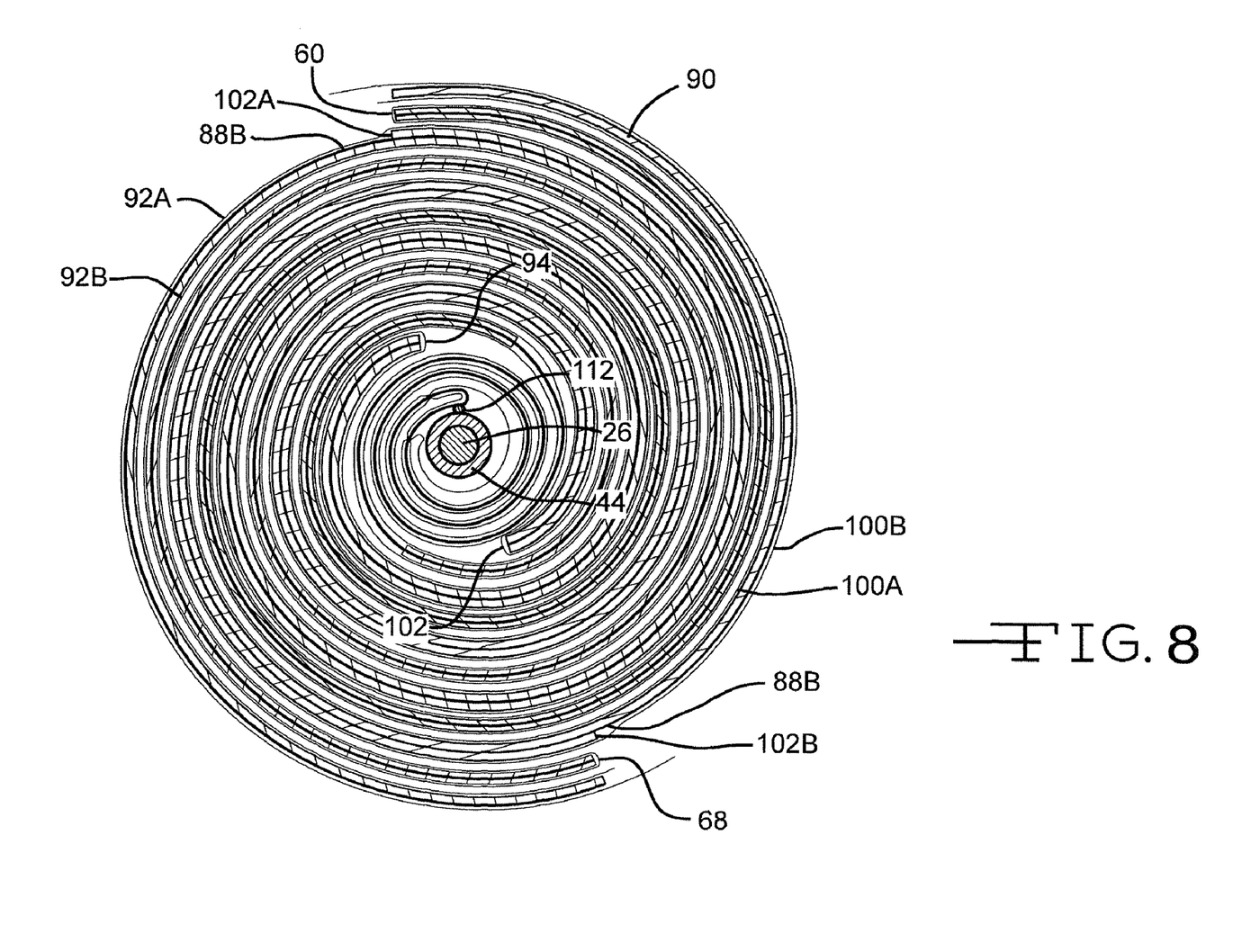
FIG. 8 is a cross-sectional view of the electrode assembly that results from winding the cathode current collector 110 connected to the terminal pin 26/couple 44 assembly of FIG. 7.
Figure 9:
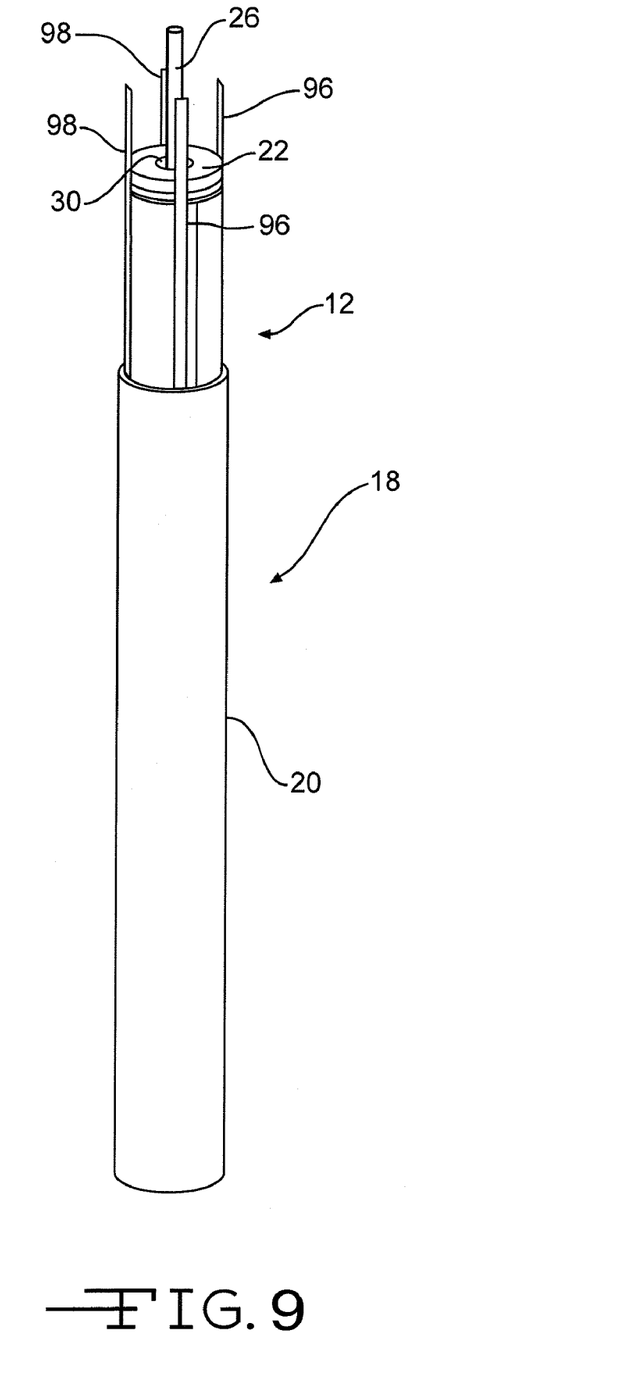
FIG. 9 is an isometric view showing the electrode assembly 12 being housed inside a casing 18.

FIG. 7 illustrates an alternate embodiment of the cathode current collector secured to the couple 44. Instead of their being right and left cathode current collector strips 52A, 52B as in the embodiment shown in FIGS. 5 and 5A, the cathode current collector 110 is a continuous strip-shaped member. A mid-portion of this current collector 110 is secured to the couple 44 at a tangential point thereof by weld 112. Then, the cathode is associated with an anode 16 comprising first and second anode strips 84, 86 as previously described and wound into the galaxy configuration illustrated in FIG. 8.

Figure 10:
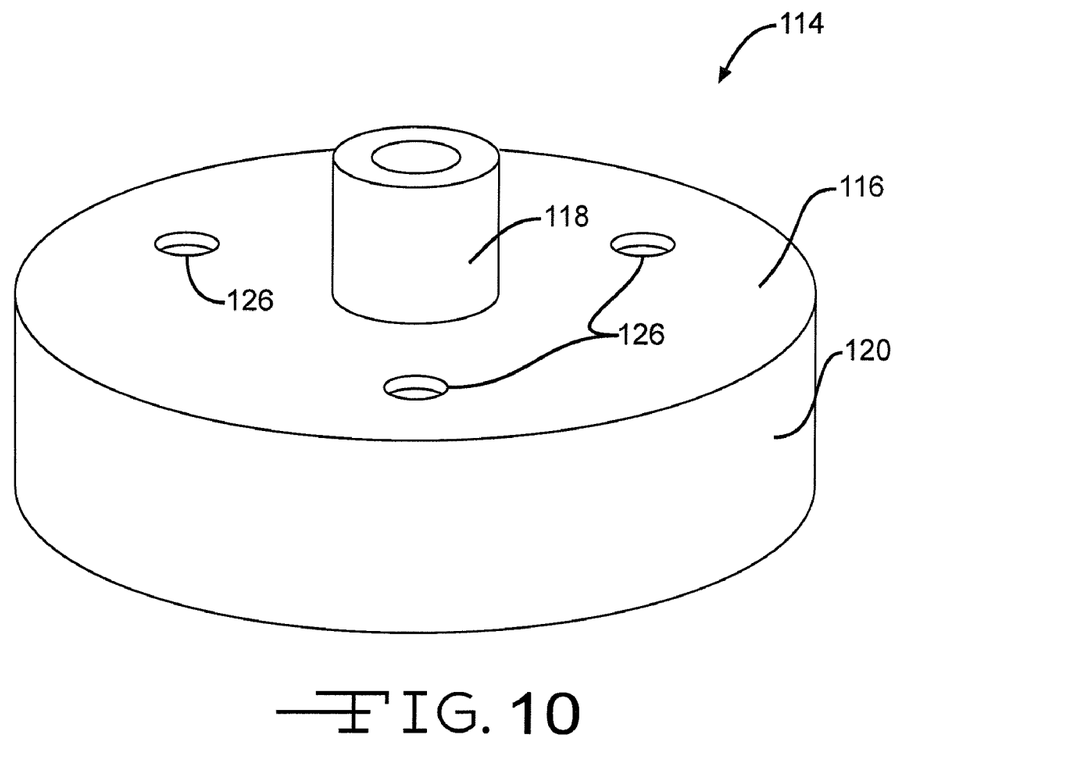
FIG. 10 is an isometric view of a lower insulator 114 connected to the lower portion of the terminal pin 26/couple 44 assembly and the bottom of the electrode assembly 12 centered in the casing 18 from the lower lid and casing sidewalls as shown in FIG. 1.

As shown in FIG. 10, the lower end of the electrode assembly 12 is provided with an insulator 114. The lower insulator 114 is a unitary member of a polymeric material and comprises a disc 116 supporting an upper centrally located sleeve 118 and a depending annular rim 120. Together, the disc 116 and annular rim 120 provide the shape of an inverted cup. The lower insulator 114 is fitted onto the distal end 44A (FIGS. 1 to 3) of the terminal couple 44 to electrically separate the pin and the lower portion of the electrode assembly from the bottom of the lower lid and the casing sidewalls. This prevents bridging of lithium clusters between surfaces of opposite polarity. It also redundantly centers and supports the electrode assembly within the casing 18.

Prior to activating the electrode assembly, the circular shaped lower lid 24, which is of the same material as the casing tube 20, is received in the lower end of the tube 20 in a tight fitting relationship and secured therein by a weld 122 (FIG. 1). A central opening 124 in the lower lid 24 provides for filling an electrolyte (not shown) into the casing 18 for activating the cell 10. Three openings 126 in the disc 116 help the electrolyte flow through the lower insulator 100 to wet the electrode assembly 12. A fill plug 128 is then fitted into the central opening 124 in the closure plate 24 and sealed therein such as by laser welding to hermetically seal the cell.

Figure 11:
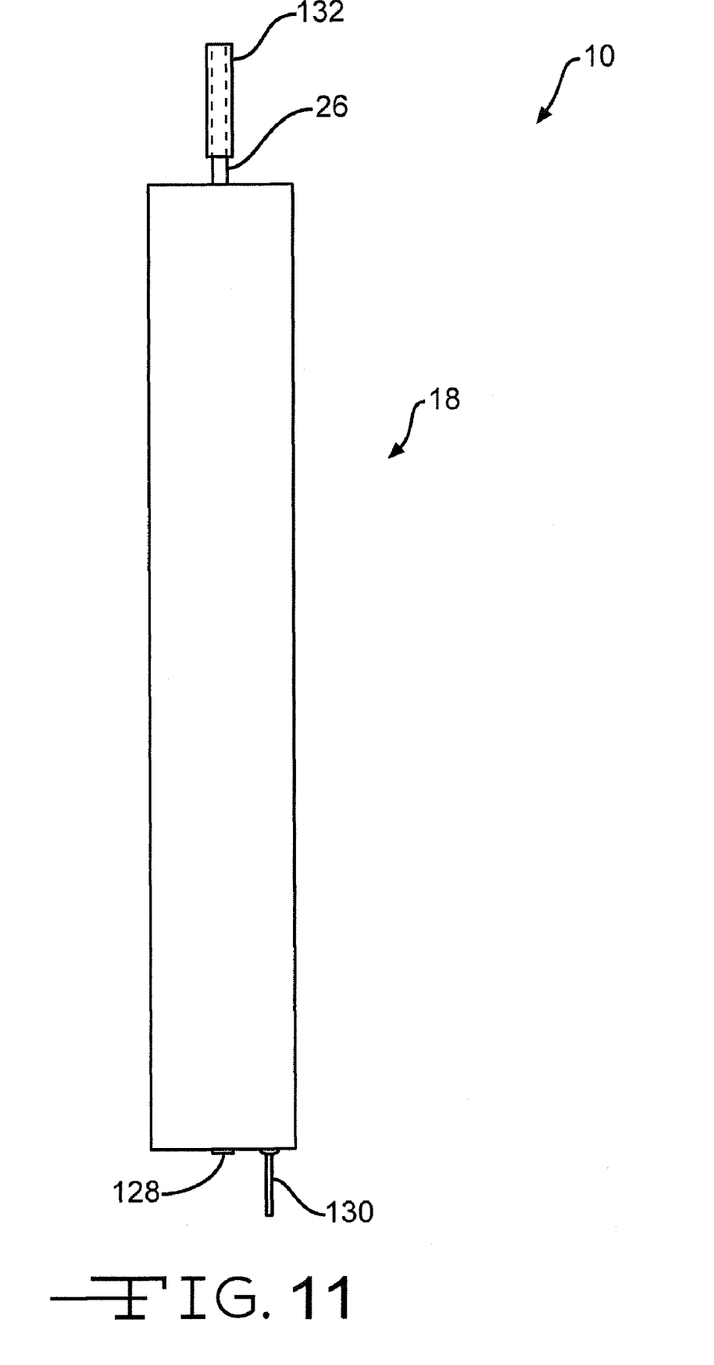
FIG. 11 is a side elevational view of the completed electrochemical cell 10.

As shown in FIG. 11, the cell is completed by securing a negative polarity connection pin 130 to the lower lid 24 in electrical continuity with the casing tube 20 and upper lid 22 between which the anode current collector leads 96, 98 are captured. A sleeve 132 is fitted onto the positive terminal pin 26 to help in making electrical connection there.

By way of example, in an illustrative primary cell, the anode is of an alkali metal, preferably lithium, contacted to a nickel, copper or stainless steel current collector. The active material of the cathode body is a silver vanadium oxide cathode material as described in U.S. Pat. Nos. 4,310,609 and 4,391,729 or copper silver vanadium oxide as described in U.S. Pat. Nos. 5,472,810 and 5,516,340, all assigned to the assignee of the present invention, the disclosures of which are hereby incorporated by reference. Other suitable cathode materials include copper vanadium oxide, manganese dioxide, titanium disulfide, copper oxide, copper sulfide, iron sulfide, and iron disulfide. Carbon, fluorinated carbon and lithium cobalt oxide are also useful cathode active materials.

Illustrative separator 74 materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The activating electrolyte can be a 1.0M to 1.4M solution of $LiAsF_6$ or $LiPF_6$ in a 50:50 mixture of, by volume, 1,2-dimethoxyethene and propylene carbonate.

This electrochemical system is of a primary cell type. However, those skilled in the art will readily recognize that the cell of the present invention can be readily adapted to both primary electrochemical systems of either a solid cathode or liquid cathode type, or a secondary cell such as a lithium ion cell having a carbonaceous negative electrode and lithium cobalt oxide positive electrode.

In the secondary electrochemical cell, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glass carbon, "hairy carbon" etc.), which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes capable of withstanding degradation during repeated charge/discharge cycling. Moreover, the high surface area of carbon fibers allows for rapid charge/discharge rates.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

An electrolyte is also required to activate the anode/cathode combination in the secondary system. The composition of the electrolyte depends on the materials of construction of the anode and the cathode as well as the product application for the cell. A preferred electrolyte for a lithium ion secondary cell has a lithium salt dissolved in a solvent system of dimethyl carbonate, diethyl carbonate, ethyl methyl carbonate and propylene carbonate.

It is appreciated that various modifications to the inventive concepts described herein may be apparent to those of ordinary skill in the art without departing from the scope of the present invention as defined by the appended claims.

What is claimed is:

1. An electrochemical cell, which comprises:
   a) a terminal pin;
   b) a first electrode strip comprising a first current collector having a right current collector portion and a left current collector portion extending in opposite directions from an intermediate current collector portion, the right and left current collector portions being contacted by an electrode active material to thereby form a right first electrode portion and a left first electrode portion with the intermediate current collector portion being left uncovered and secured to the terminal pin;
   c) a first separator comprising a lower first separator portion covering a lower surface of the first electrode strip and an upper first separator portion covering an upper surface of the first electrode strip, wherein the intermediate current collector portion is at least partially perforated with the lower first separator portion being secured to the upper first separator portion through the perforations in the intermediate current collector portion;
   d) a second, counter electrode comprising a right second electrode strip and a left second electrode strip, each of the second electrode strips comprising a counter electrode active material contacted to a second current collector, wherein the right second electrode strip is disposed in an overlapping relationship with the right first electrode portion, one on top of the other, and the left second electrode strip is disposed in an overlapping relationship with the left first electrode portion, one on top of the other, with the lower first separator portion secured to the upper first separator portion through the perforations in the intermediate current collector portion physically segregating the first electrode from direct contact with the second electrode, wherein the first and second electrodes are characterized as having been wound into an electrode assembly with the terminal pin serving as the terminal for the first electrode strip;
   e) a casing housing the electrode assembly and serving as a counter terminal for the second electrode electrically insulated from the first electrode; and
   f) an electrolyte activating the first and second electrodes housed in the casing.

2. The electrochemical cell of claim 1 wherein the right and left second electrode strips each have a proximal end positioned adjacent to where the uncovered intermediate portion of the first current collector is secured to the terminal pin and a distal end adjacent to spaced apart ends of the first electrode.

3. The electrochemical cell of claim 1 wherein the first current collector is perforated where it is contacted by the electrode active material.

4. The electrochemical cell of claim 1 wherein the terminal pin electrically connected to the first current collector at the uncovered intermediate portion extends out beyond the separator to interrupt a sealed peripheral separator edge thereof and wherein the terminal pin is electrically insulated from the casing connected to the second electrode as its terminal.

5. The electrochemical cell of claim 4 wherein the terminal pin is supported in a lid by an insulating glass and wherein the lid is fitted to the casing housing the first and second electrodes.

6. The electrochemical cell of claim 4 wherein the terminal pin is received in a couple directly connected to the uncovered intermediate portion of the first current collector.

7. The electrochemical cell of claim 1 wherein in the wound electrode assembly, the second current collectors of the respective right and left second electrode strips each provide at least one extending lead.

8. The electrochemical cell of claim 1 wherein together the second current collectors of the respective right and left second electrode strips provide at least two leads captured between a lid and a cylindrical tube comprising the casing.

9. An electrochemical cell, which comprises:
a) a terminal pin;
b) a first electrode comprising at least two first electrode strips, each comprising an electrode active material contacted to a first current collector, wherein a left portion of a right one of the first current collectors and a right portion of a left one of the first current collectors are left uncovered by the electrode active material and secured to the terminal pin;
c) a first separator comprising a lower first separator portion covering a lower surface of the first electrode and an upper first separator portion covering an upper surface of the first electrode, wherein the left portion of the right first current collector and the right portion of the left current collector are at least partially perforated with the lower first separator portion being secured to the upper first separator portion through these perforations;
d) a second, counter electrode comprising a right second electrode strip and a left second electrode strip, each of the second electrode strips comprising a counter electrode active material contacted to a second current collector, wherein the right second electrode strip is disposed in an overlapping relationship with the right first electrode strip, one on top of the other, and the left second electrode strip is disposed in an overlapping relationship with the left first electrode strip, one on top of the other, with the lower first separator portion secured to the upper first separator portion through the perforations in the right and left first current collectors physically segregating the first electrode from direct contact with the second electrode, wherein the first and second electrodes are characterized as having been wound into an electrode assembly with the terminal pin serving as the terminal for the first electrode;
e) a casing housing the electrode assembly and serving as a counter terminal for the second electrode electrically insulated from the first electrode; and
f) an electrolyte activating the first and second electrodes housed in the casing.

10. The electrochemical cell of claim 9 wherein the first electrode is the cathode and the second electrode is the anode.

11. The electrochemical cell of claim 9 wherein the uncovered portions of the first current collectors are secured to diametrically opposite positions on the terminal pin.

12. The electrochemical cell of claim 9 wherein the terminal pin electrically connected to the first current collectors at their uncovered portions extends out beyond the separator to interrupt a sealed peripheral edge thereof and wherein the terminal pin is electrically insulated from the casing connected to the anode as its terminal.

13. The electrochemical cell of claim 9 wherein the terminal pin is supported in a lid by an insulating glass and wherein the lid is fitted to a cylindrical casing housing the first and second electrodes.

14. The electrochemical cell of claim 9 wherein the terminal pin is of molybdenum and received in a couple secured to the uncovered portion of the first current collectors.

15. The electrochemical cell of claim 9 wherein in the wound electrode assembly, an outer wrap of the second electrode has the counter electrode active material on only an inner side of the second current collectors.

16. The electrochemical cell of claim 9 wherein the second current collectors of the respective right and left second electrode strips each have extending leads captured between a lid and a cylindrical tube comprising the casing.

17. The electrochemical cell of claim 9 wherein the right and left second electrode strips each have a proximal end positioned adjacent to where the uncovered portions of the right and left first current collectors are secured to the terminal pin and a distal end adjacent to spaced apart ends of the right and left first electrode strips.

18. A method for providing an electrochemical cell, comprising the steps of:
a) contacting a cathode active material to a cathode current collector to form a cathode in the form of a cathode strip having a right cathode current collector portion and a left cathode current collector portion extending in opposite directions from an intermediate cathode current collector portion left uncovered by the cathode active material;
b) electrically connecting a terminal pin to the uncovered portion of the cathode current collector;
c) contacting an anode active material to an anode current collector to form an anode in the form of an anode strip;
d) providing a first separator comprising a lower first separator portion and an upper separator portion and covering a lower surface of the cathode with the upper first separator portion and an upper surface of the cathode with the upper separator portion, and securing the lower first separator portion to the upper first separator portion through perforations in the intermediate cathode current collector portion;
e) aligning the anode strip with the cathode strip in an overlaying relationship and winding them into a galaxy wound electrode assembly;
f) housing the electrode assembly in a casing, wherein the terminal pin joined to the cathode is electrically insulated from the casing connected to the anode as its terminal; and
g) activating the anode and the cathode with an electrolyte.

19. The method of claim 18 including providing the anode in the form of two anode strips, each having a proximal end residing adjacent to where the uncovered portion of the cathode current collector is secured to the terminal pin and a distal end adjacent to spaced apart ends of the cathode.

20. The method of claim 18 including providing the terminal pin having opposed first and second ends extending beyond a sealed peripheral edge of the separator and imparting a rotational force to at least one of the first and second terminal pin ends to wind the overlaying anode and cathode into the galaxy wound electrode assembly.

21. The method of claim 18 including supporting the first end of the terminal pin in a lid for a casing by an insulating sealing glass and fitting the lid into a cylindrical casing housing the galaxy wound electrode assembly.

22. The method of claim 18 including the anode current collector providing at least one extending lead captured between a cylindrical tube and a lid comprising the casing.

23. The method of claim 18 including providing the anode contacting the casing as the negative terminal and wherein an outer wrap of the galaxy wound electrode assembly has the anode active material on only an inner side of the anode current collector.

24. An electrochemical cell, which comprises:
a) a terminal pin;
b) a first electrode strip comprising a first current collector having a right current collector portion and a left current collector portion extending in opposite directions from an intermediate current collector portion, the right and left current collector portions being contacted by an electrode active material to thereby form a right first electrode portion and a left first electrode portion with the intermediate current collector portion being left uncovered and secured to the terminal pin;
c) a first separator comprising a lower first separator portion covering a lower surface of the first electrode strip and an upper first separator portion covering an upper surface of the first electrode strip, wherein the intermediate current collector portion is at least partially perforated with the lower first separator portion being secured to the upper first separator portion through the perforations in the intermediate current collector portion;
d) a second, counter electrode comprising a counter electrode active material contacted to a second current collector, wherein the second electrode is disposed in an overlapping relationship with the first electrode with the lower first separator portion secured to the upper first separator portion through the perforations in the intermediate current collector portion physically segregating the first electrode from direct contact with the second electrode, wherein the first and second electrodes are characterized as having been wound into an electrode assembly with the terminal pin serving as the terminal for the first electrode strip;
e) a casing housing the electrode assembly and serving as a counter terminal for the second electrode electrically insulated from the first electrode; and
f) an electrolyte activating the first and second electrodes housed in the casing.

* * * * *